United States Patent [19]

Hanchett

[11] 3,900,832

[45] Aug. 19, 1975

[54] BAR CODE PROCESSING AND DETECTING SYSTEM

[75] Inventor: Leland J. Hanchett, Winchester, Mass.

[73] Assignee: Taplin Business Machines Incorporated, Burlington, Mass.

[22] Filed: Sept. 17, 1973

[21] Appl. No.: 398,035

[52] U.S. Cl. ................ 340/146.3 Z; 340/146.3 AG

[51] Int. Cl. ............................................ G06k 9/18

[58] Field of Search ........... 340/146.3 AG, 146.3 H, 340/146.3 MA, 146.3 R, 146.3 Z; 235/61.11 E

[56] References Cited

UNITED STATES PATENTS

| | | | |
|---|---|---|---|
| 3,176,271 | 3/1965 | Mader | 340/146.3 MA |
| 3,525,982 | 8/1970 | Cooreman et al. | 340/146.3 R |
| 3,560,927 | 2/1971 | Rabinow et al. | 340/146.3 MA |
| 3,701,095 | 10/1972 | Yamaguchi et al. | 340/146.3 MA |
| 3,701,099 | 10/1972 | Hall et al. | 340/146.3 AG |
| 3,727,184 | 4/1973 | Roza et al. | 340/146.3 H |
| 3,747,066 | 7/1973 | Vernot et al. | 340/146.3 AG |

*Primary Examiner*—Leo H. Boudreau
*Attorney, Agent, or Firm*—Erwin Salzer

[57] ABSTRACT

The bar code reading and processing system includes inverters and summing amplifiers to eliminate by means of correlation techniques masking of the bar code signals by additive noise. The system further includes self-thresholding means for eliminating variables in the optical reading of bar coded material.

2 Claims, 23 Drawing Figures

FIG. 1 FIG. 2
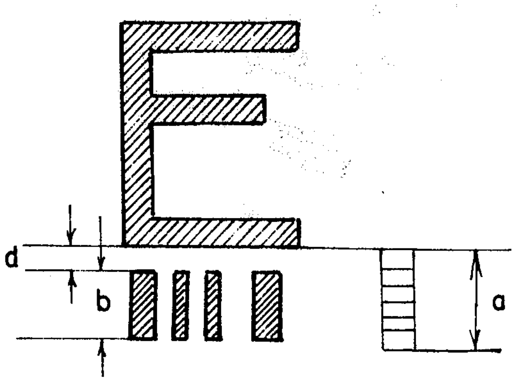
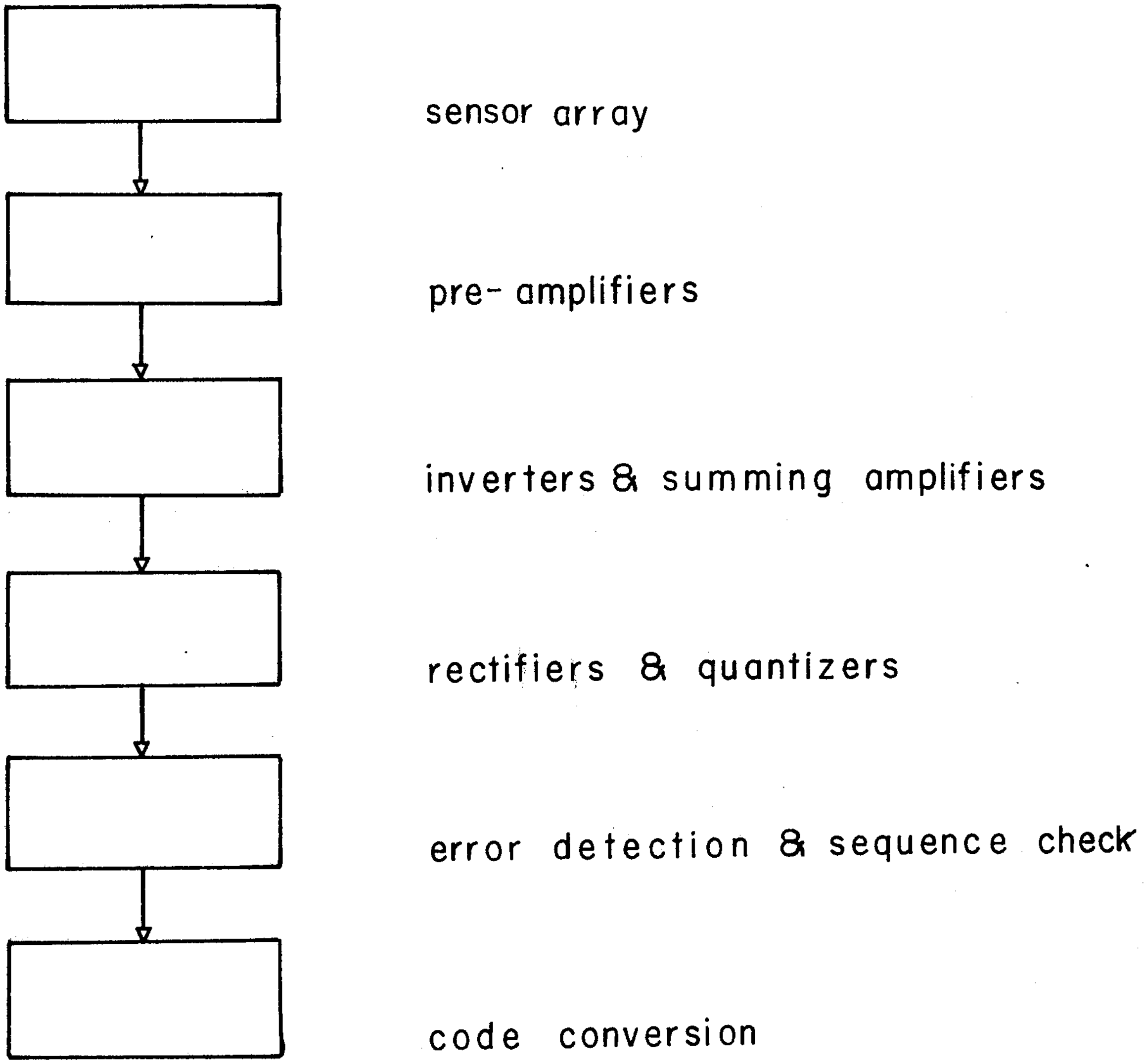
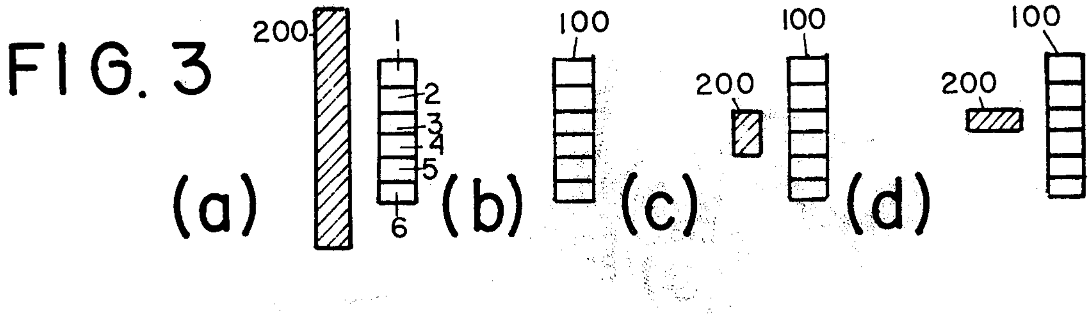

BAR CODE PROCESSING AND DETECTING SYSTEM

BACKGROUND OF THE INVENTION

This invention relates to reading of bar coded information, and particularly information printed in dual line form, one line, e.g. the upper line, being printed in alphanumeric or like man readable symbols, and another line, e.g. the lower line, being printed in small coded bars of equal height.

In such readers it may happen that the light sensors thereof read in addition to the coded bars also portions of the alphanumeric or like printed symbols which then appear as noise in the coded signal. It is one object of this invention to provide correlation means for eliminating that kind of noise. More generally speaking, it is one object of the invention to provide a bar code reader with correlation circuitry which eliminates noise caused by background effects, ensures that the intensity of signals resulting from unwanted printed vertical strokes cannot exceed the intensity of signals resulting from wanted bar code strokes, which reader further covers the entire bar code print zone and even exceeds the same, and also eliminates noise mutually coupled into all its transducers.

The output of an optical bar code reader may be referred to as an analog signal because it is in the form of continuous voltages having relatively long rise times and decay times rather than in strictly binary form. Such a signal must be quantized for further processing. An analog bar signal is subject to such variables as print consistency, illumination level, and component tolerances. These variables may affect the overall signal amplitude of a bar code reader, and even individual bar code amplitudes. Similar effects can be caused by slight out of focus conditions of the lens system of the reader, or by smudging. A reduction of the optical resolution of a reader can result in filling of the narrow gaps, or spaces, between contiguous bar code signals. It is, therefore, a further object of this invention to provide bar code reading and processing systems which are not subject to the above drawbacks and limitations.

The bar code reading and processing systems embodying this invention are more particularly intended to read the kind of bar coded material which is printed with the printing devices disclosed and claimed in the patent application of John F. Taplin, filed 6/23/72; Ser. No. 265,637 for PRINTING AND PROCESSING INFORMATION IN BINARY FORM assigned to the same assignee as the present patent application.

SUMMARY OF THE INVENTION

A bar code reader and processor embodying this invention includes a linear array of light sensitive sensor cells; a plurality of individual pre-amplifiers for amplifying individually the output of each of said cells of said array; a plurality of inverters for inverting the output of a portion of said plurality of pre-amplifiers; and a plurality of summing amplifiers for adding the non-inverted outputs and the inverted outputs of said plurality of pre-amplifiers.

A bar code reader embodying this invention further includes quantizing circuitry under the control of a character presence signal.

BRIEF DESCRIPTION OF THE DRAWINGS

FIG. 1 shows on a very large scale the image of a capital letter E associated with the image of a corresponding bar code symbol including four bars and three inter-bar spaces and with a linear array of photosensors which includes six such sensors;

FIG. 2 is a simplified block diagram of a system embodying this invention including portions thereof not related to this invention;

FIGS. 3(*a*) to 3(*d*) show four basic situations to which a six cell radiation sensing array shown in FIG. 1 may be subjected;

FIGS. 5(*a*) – 5(*d*) illustrate diagrammatically how signal currents emitted from the photosensor array shown in FIGS. 1 and 3(*a*) to 3(*d*) are affected by the inverters forming part of the correlation circuitry embodying this invention;

DESCRIPTION OF PREFERRED EMBODIMENTS

Figures 4, 5A, 5B, 5C, 5D:
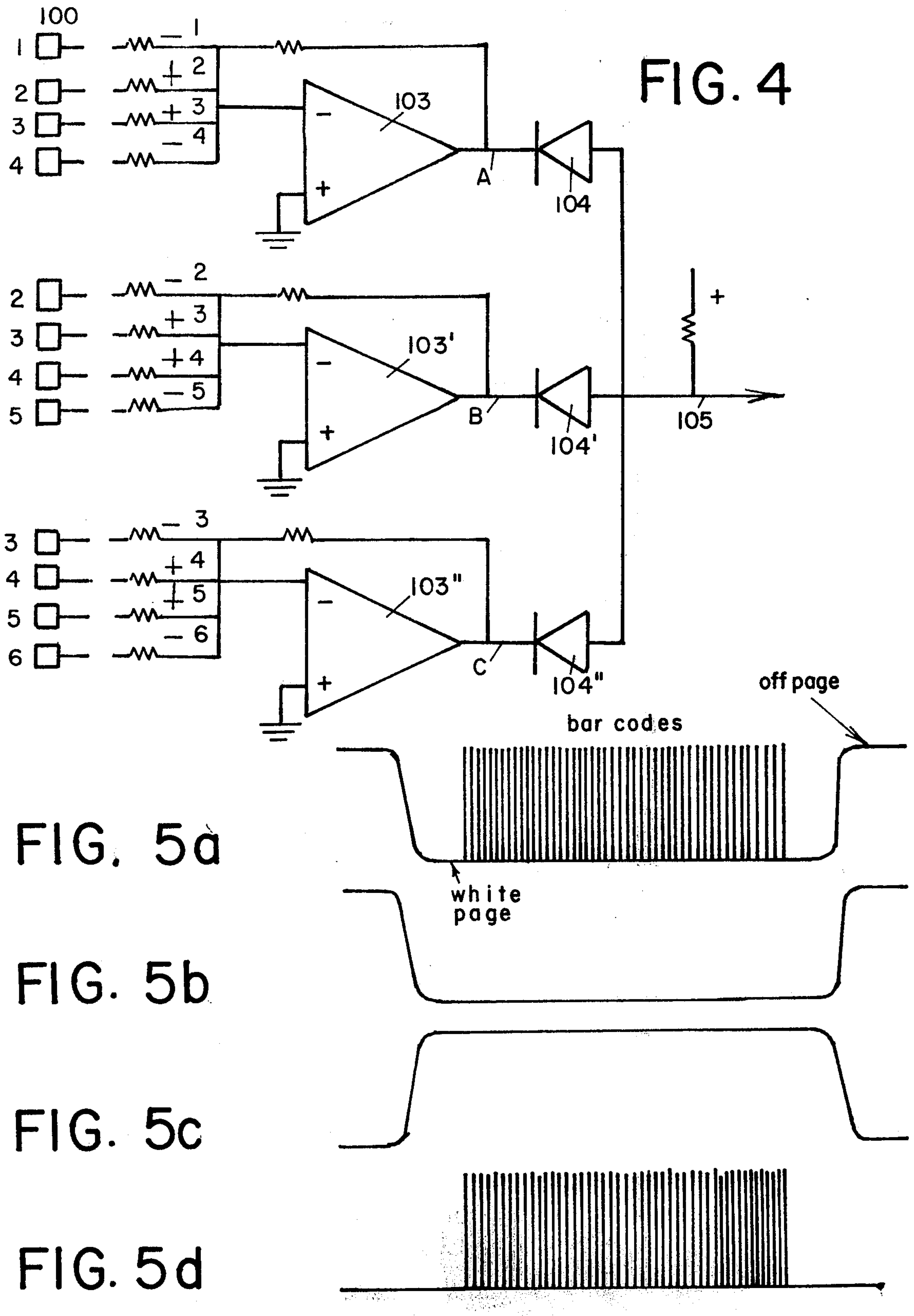
FIG. 4 is a diagrammatic representation of the correlation circuitry embodying this invention.

Referring now to the drawings, and more particularly to FIG. 1 thereof, in order that the code bars can be distinguished from the alphanumeric symbols which are arranged above the code bars - but which might also be arranged below the code bars - it is necessary to separate both physically. In FIG. 1 the clear spacing between the code bars and the lower edge of alphanumeric symbols has been designated by the letter $d$, the height of the code bars has been designated by the letter $b$ and the height of the array of radiation sensitive sensors has been designated by the letter $a$. Assuming that the letter E is initially of standard size for typewriters (10 characters per inch pitch information density). If any conventional bar code were arranged below a letter E of standard size, the clear space $d$ would become too small. However, the four bar-three inter-bar spaces bar code forming part of the type faces disclosed in the above referred-to patent application of John F. Taplin allows to miniaturize the code bars on the type faces, and more particularly to drastically reduce the height $b$ of the bars. As a result of such miniaturization, the clearance $d$ may be made about 1.5 the height $b$ of the bars, and the height of the sensor window or the length $a$ of the linear array of photosensors be made about equal to 1.5 $b$ plus $b$, i.e. about 2.5 $b$. While not limited to typed matter having such proportions, the invention is primarily intended to be used to read typed matter having these proportions.

It will be apparent from the foregoing that FIG. 1 does not illustrate the possibility of the reduction of bar size which can be achieved by adoption of the coding method disclosed in the above application of John F. Taplin since in FIG. 1 $b < d$, rather $d > b$. The miniaturization of the bar code of Taplin wherein each character includes four bars and three inter-bar spaces requires a great precision in electro-optically reading the bars and processing of the resulting signal currents which degree of precision can be achieved with the circuitry which is described below in detail.

The block diagram of FIG. 2 shows the units of which a reading and processing system embodying this invention consists. The block on the top of the column marked sensor array stands for the conventional light or radiation sensitive means whose output is referred-to as the electric analog signal of the bar code printed information. The output of each cell of the sensor array is amplified in an individual pre-amplifier, and the pre-amplifiers forming part of the system are symbolized by the rectangle immediately below the top rectangle. The output of the pre-amplifiers forms the input of inverters and summing amplifiers which form the system's correlation means proper. The output of the summing amplifiers forms the input of rectifiers and quantizers, and of the circuitry which processes the analog signals preparatory to quantizing thereof. The output of the quantizers forms the input of error detection and sequence check means. These may be of a conventional design. My patent application Ser. No. 406,518 filed Oct. 15, 1973 for ERROR DETECTION AND SEQUENCE MAINTAINING SYSTEM FOR BAR-CODE READERS, assigned to the same assignee as the present patent application discloses error detection and sequence check means specially intended for the aforementioned four bar and three inter-bar space code disclosed in the above patent application of John F. Taplin. The last stage of the system is a code conversion stage, for instance converting the four bar and three inter-bar space code into another code, e.g. the USAS CII code. The system may be provided with other means for additional purposes which need not to be considered in this context for a full understanding of the present invention.

In FIGS. 3(*a*) to 3(*d*) reference numeral 100 has been applied to indicate a linear array of light sensors or cells and reference numeral 200 has been applied to indicate various shapes which the cells of the array 100 may be called upon to read. According to FIG. 3(*a*) the shape 200 is a long dark vertical bar, according to FIG. 3(*b*) any particular shape is absent, i.e. the array is called upon to read white paper, according to FIG. 3(*c*) the array 100 is called upon to read a short vertical code bar 200, and according to FIG. 3(*d*) the array 100 is called upon to read a horizontal bar 200 whose height is less than that of the code bar 200 of FIG. 3(*c*).

The individual cells of array 100 may be numbered consecutively 1 to 6, and their output may likewise be numbered consecutively 1 to 6. The inverted output of cells 1 to 6 may be designated by a − sign followed by the number of the respective cell, and the non-inverted output of cells 1 to 6 may be designated by a + sign followed by the number of the respective cell.

FIG. 4 shows three summing amplifiers 103, 103′, and 103″. The input of amplifiers 103 is formed by the algebraic sum of the signals −1, +2, +3, −4; the input of the amplifier 103′ is formed by the algebraic sum of the signals −2, +3, +4, −5, and the input of the summing amplifier 103″ is formed by the algebraic sum of the signals −3, +4, +5, −6. This has also been indicated in FIG. 4. FIG. 4 further shows three half-wave rectifiers, or diodes, 104, 104′ and 104″, each arranged in the output circuit of one of the summing amplifiers 103, 103′ and 103″. Diodes 104, 104′ and 104″ are connected in parallel.

If one assigns arbitrarily the figure 0 to the output of each cell 1 to 6 of array 100 when the cell is called upon to read the white of white paper, and one assigns arbitrarily the figure 25 to the output of each cell called upon to read a dark stroke such as that of a code bar, the following table obtains for a group of four cells 1 to 4.

SUMMING AMPLIFIER OUTPUT OF FOUR CELLS 1–4

| | | |
|---|---|---|
| I. Long Black Bar FIG. 3(*a*) | | |
| cell no. 1 | 0 | 0 |
| cell no. 2 | 0 | 0 |
| cell no. 3 | 0 | 0 |
| cell no. 4 | 0 | 0 |
| | 0 | 0 |
| II. White Paper FIG. 3(*b*) | | |
| cell no. 1 | 25 | −25 |
| cell no. 2 | 25 | +25 |
| cell no. 3 | 25 | +25 |
| cell no. 4 | 25 | −25 |
| | | 0 |
| III. Short Code Bar on White Background FIG. 3(*c*) | | |
| cell no. 1 | 25 | −25 |
| cell no. 2 | 0 | 0 |
| cell no. 3 | 0 | 0 |
| cell no. 4 | 25 | −25 |
| | | −50 |
| IV. Horizontal Bar FIG. 3(*d*) | | |
| cell no. 1 | 25 | −25 |
| cell no. 2 | 25 | +25 |
| cell no. 3 | 0 | 0 |
| cell no. 4 | 25 | +25 |
| | | +25 |

It will be apparent from FIG. 4 that the six cells 1–6, the inverters for their output and the three adding amplifiers 103, 103′ and 103″ form three overlapping matrices.

The outputs of summing amplifiers 103, 103′ and 103″ may be referred-to as $S_1$, $S_2$, $S_3$, respectively, and the amplified outputs of cells 1–6 may be referred-to as $C_1$, $C_2 \ldots C_5$, $C_6$. Then the following equations obtain:

$$S_1 = (C_2 + C_3) - (C_1 + C_4)$$
$$S_2 = (C_3 + C_4) - (C_2 + C_5)$$
$$S_3 = (C_4 + C_5) - (C_3 + C_6).$$

The tables below indicate the sums $S_1$, $S_2$ and $S_3$ for the situations shown in FIGS. 3(*a*) – 3(*d*) assuming again that the amplified output of each cell 1–6 seeing white paper is 25, and that the amplified output of each cell seeing dark or black paper is 0.

| | | $S_1$ | $S_2$ | $S_3$ |
|---|---|---|---|---|
| I. Long Black Bar FIG. 3(*a*) | | | | |
| cell no. 1 | 0 | 0 | 0 | 0 |
| cell no. 2 | 0 | 0 | 0 | 0 |
| cell no. 3 | 0 | 0 | 0 | 0 |
| cell no. 4 | 0 | 0 | 0 | 0 |
| cell no. 5 | 0 | 0 | 0 | 0 |
| cell no. 6 | 0 | 0 | 0 | 0 |
| | | 0 | 0 | 0 |
| II. White Paper FIG. 3(*b*) | | $S_1$ | $S_2$ | $S_3$ |
| cell no. 1 | 25 | −25 | | |
| cell no. 2 | 25 | +25 | −25 | |
| cell no. 3 | 25 | +25 | +25 | 25 |
| cell no. 4 | 25 | −25 | +25 | +25 |
| cell no. 5 | 25 | | −25 | +25 |
| cell no. 6 | 25 | | | −25 |
| | | 0 | 0 | 0 |

–Continued

III. Short Code Bar on White Background
FIG. 3(c)

| | | $S_1$ | $S_2$ | $S_3$ |
|---|---|---|---|---|

I. Long Black Bar FIG. 3(*a*)

| | | $S_1$ | $S_2$ | $S_3$ |
|---|---|---|---|---|
| cell no. 1 | 25 | −25 | | |
| cell no. 2 | 25 | +25 | −25 | |
| cell no. 3 | 0 | 0 | 0 | 0 |
| cell no. 4 | 0 | 0 | 0 | 0 |
| cell no. 5 | 25 | 0 | −25 | +25 |
| cell no. 6 | 0 | 0 | | −25 |
| | | 0 | −50 | 0 |

IV. Horizontal Bar FIG. 3(*d*)

| | | $S_1$ | $S_2$ | $S_3$ |
|---|---|---|---|---|
| cell no. 1 | 25 | −25 | | |
| cell no. 2 | 25 | +25 | −25 | |
| cell no. 3 | 0 | +25 | 0 | 0 |
| cell no. 4 | 25 | −25 | +25 | +25 |
| cell no. 5 | 25 | 0 | −25 | +25 |
| cell no. 6 | 25 | 0 | 0 | −25 |
| | | 0 | −25 | +25 |

It is apparent from the foregoing that the output of one of the three summing amplifiers 103, 103′, 103″ will reach a maximum value (in the instant case −50) only in the presence of a short vertical code bar. This is the result intended to be achieved by the circuitry of FIG. 4.

By using balanced matrices, i.e. matrices having equal positive and negative outputs in the presence of white background, the white background is cancelled out. This is shown more clearly in FIGS. 5*a* – 5*d*.

Referring now to FIGS. 5*a* – 5*d*, these figures have been drawn on the assumption that cells 1–6 are biased so that each when seeing white has an output voltage of 0 volts, and when seeing dark, or black, has an output voltage of 1 volt. The output under such conditions of a single cell scanning a line of bar codes is diagrammatically shown in FIG. 5*a*. FIG. 5*b* shows the output under such conditions of a single cell scanning off the bar codes. FIG. 5*c* shows the inversion of the signal shown in FIG. 5*b*, and FIG. 5*d* shows diagrammatically the algebraic sum of the signals shown in FIGS. 5*a* and 5*c* or, in other words, the cancellation of the background signal.

Figures 6, 7, 8, 9:
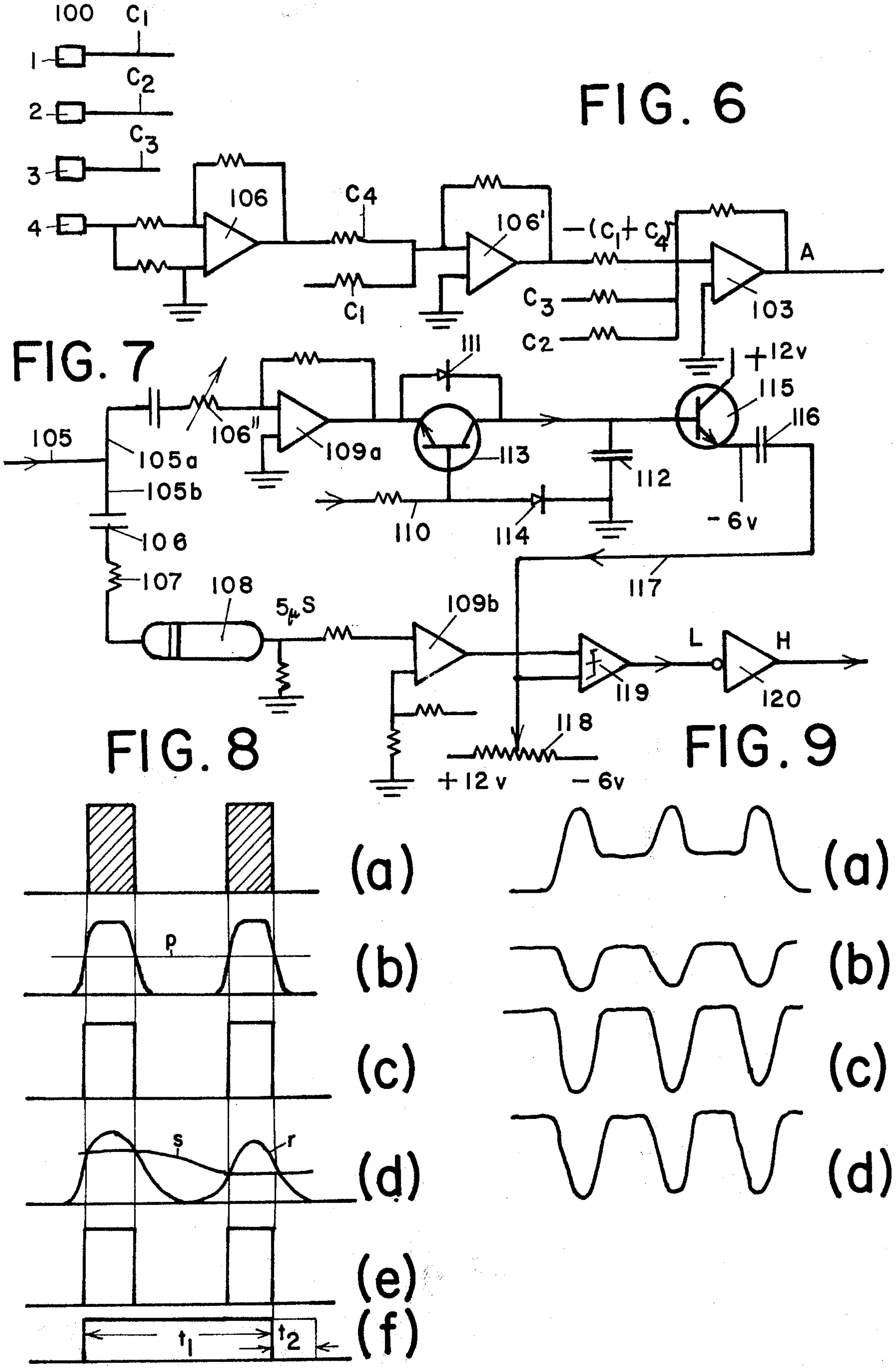
FIG. 6 is a more complete representation of the same circuitry shown more diagrammatically in FIG. 4.
FIG. 7 shows circuitry for further processing the output of the circuitry shown in FIG. 6 and, to be more specific, to control the bar signals in accordance with variable threshold values.
FIGS. 8(*a*) – 8(*f*) are a set of diagrams explaining the need of the circuitry of FIG. 7 and its function.
FIGS. 9(*a*) – 9(*d*) illustrate the outputs at various points of the circuitry shown in FIG. 4.

It is apparent from the tables above that the maximum output of any of the summing amplifiers 103, 103′, 103″ occurs only if the array of cells 1–6 sees a short bar stroke. The output of any of the summing amplifiers 103, 103′, 103″ will be substantially less than maximum in the absence of a short bar stroke. By rectifying the outputs of summing amplifiers 103, 103′, 103″ by means of half wave rectifiers 104, 104′, 104″ the outgoing line 105 will carry only the most negative going signals. This has been illustrated in FIG. 9(*a*) – 9(*d*). FIG. 9((*a*) shows the output voltage of summing amplifier 103, or the voltage at point A of FIG. 4, FIG. 9(*b*) shows the output voltage of amplifier 103′, or the voltage at point B of FIG. 4, FIG. 9(*c*) shows the output of summing amplifier 103″, or the voltage at point C of FIG. 4, and FIG. 9(*d*) shows the voltage in outgoing line 105 of FIG. 4. The voltage traces of FIGS. 9(*c*) and 9(*d*) are the same. When diode 104″ becomes conductive, the current paths including diodes 104 and 104′ are shunted out.

It will be apparent from the foregoing that if signals resulting from reading alphanumeric symbols should appear in the electrooptical transducer or array 100, including cells 1 to 6, rather than bar code signals only, the noise which the former tend to create is completely eliminated by virtue of the correlation means described above, including summing amplifiers 103, 103′, 103″.

The contemplated miniaturization of the bar code compels to reduce the sum of the clear zone *d* between alphanumeric symbols and bar symbols and the bar height *b* of FIG. 1 to the order of 0.080 inch. The use of three matrices including six cells 1 to 6 as shown in FIG. 4 permits full coverage of the distance of 0.080 inch. Vertical strokes taller than 0.040 inch are rejected.

FIG. 6 shows more completely the circuitry associated with summing amplifier 103 and cells 1,2,3,4 of array 100. The circuitry of the other summing amplifiers 103′, 103″ and of their cells 2–5 and 3–6 is of the same nature as that shown in FIG. 4. Each cell 1–6 is provided with its individual pre-amplifier 106, of which but one has been shown in FIG. 6, namely that of cell 4. The summing inverter 106′ adds and inverts the amplified signals $C_1$ and $C_4$ originating from cells 1 and 4. The summing amplifier 103 has three inputs, namely $-(C_1 + C_4)$ and $C_2$ and $C_3$.

The signal appearing in line 105 of FIG. 4 is a noise free analog signal which must now be quantized.

Referring to FIG. 8(*a*) this figure shows an image of a bar code symbol including but two bars, which is sufficient for the purpose of illustration. FIG. 8(*b*) shows the analog signal resulting from scanning the image of FIG. 8*a* by an electro-optical transducer such as the array 1–6 shown in the preceding figures. Line *p* of FIG. 8(*b*) shows the line at which the signal of FIG. 8(*b*) may be quantized, or converted into the rectangular pulse signal according to FIG. 8(*c*). For reasons such as change in the level of illumination, or for other reasons, the analog signal of the two bars shown in FIG. 8(*a*) may not have the shape shown in FIG. 8(*b*), but may be distorted, as shown in FIG. 8(*d*) at *r*. This calls for a change of threshold as indicated in FIG. 8(*d*) at *s* in order to derive from the signal *s* of FIG. 8(*d*) by quantizing the rectangular pulses shown in FIG. 8(*e*). As will be shown below more in detail, quantizing may call for a character presence signal. The bar code disclosed in the above referred-to patent application of John F. Taplin in which each character is formed by four bars and three inter-bar spaces has characters of different length and results, therefore, in analog signals having different durations. Under such conditions the duration of a character presence signal may be defined as the time which elapses from the reading of the leading edge of the first bar of a character to the reading of the trailing edge of the last bar of the character plus a given fixed or unchangeable increment of time. This has been illustrated in FIG. 8(*f*) in regard to the two bars of FIG. 8(*a*) intended to constitute a character. In FIG. 8(*f*) the time interval between reading of the first leading edge of a bar pertaining to a character to the reading of the last trailing edge of a bar pertaining to the same character is indicated by the reference letter $t_1$ and the additional fixed time increment is indicated by the reference letter $t_2$. Thus the duration of a character presence signal is $t_1$ plus $t_2$.

Referring now to FIG. 7, numeral 105 has been applied to indicate the same line or conductor to which reference numeral 105 has been applied in FIG. 4 carrying the signal illustrated in FIG. 9(*d*) or, in other words, the analog signal of the code bar shown in FIG. 1. The circuitry of FIG. 7 is a quantizing circuitry proper and includes parts which are associated with it. The incoming signal in channel 105 is sub-divided into two signals of which one is carried by the threshold channel 105*a*, and the other by the signal channel 105*b*. The former channel includes a potentiometer 106'' of about 25 K which allows to control, or set, the gain in the threshold channel 105*a*, or the ratio of the gain in the threshold channel 105*a* and in the signal channel 105*b*. The signal channel includes capacitor 106, resistor 107, and delay line 108. Delay line 108 allows the signals in threshold channel 105*a* to anticipate those in signal channel 105*b* a predetermined increment of time which may be 5 $\mu$S. Reference characters 109*a* and 109*b* have been applied to indicate a pair of 748 operational amplifiers of which one is arranged in the threshold channel 105*a*, and the other in the signal channel 105*b*. Reference numeral 110 has been applied to indicate a third channel, or character presence channel, carrying a signal which indicates the presence of a bar signal. Where the characters of a bar code are of different length, the character presence signal is a pulse having the duration $t_1$ plus $t_2$, as explained in connection with FIG. 8. A circuitry for obtaining a character presence signal in case of a four bar and three inter-bar spaces code as disclosed in the above patent application of John F. Taplin is disclosed in the above referred-to copending patent application for ERROR DETECTION AND SEQUENCE MAINTENANCE SYSTEM FOR BAR CODE READERS. As long as the character presence signal in line 110 exists, or is on, the signal carried by channel 105*a* is rectified by diode 111 and supplied to capacitor 112 and stored therein. Transistor 113 is shunted across diode 111, and the base of the former is conductively connected to channel 110 carrying character presence signals. When the character presence signal is not on in channel 110, transistor 113 is turned on, thus shorting out diode 111. When diode 111 is shunted, or shortened out, by transistor 113, the voltage of capacitor 112 follows the output of threshold amplifier 109*a*. Reference character 115 has been applied to indicate a second transistor which buffers the signal stored in capacitor 112 and provides a high impedance bleed for the latter. The output of transistor 115 is a-c coupled through capacitor 116, and the d-c component of conductor 117 is brought, or adjusted, to desirable levels by means of potentiometer 118. The signal in conductor 117 connecting capacitor 116 with potentiometer 118 forms one of the inputs of the 710 comparator 119. The other input of comparator 119 is derived from signal channel 105*b*, and more particularly from operational amplifier 109*b*. The output of comparator 119 is the quantized signal as illustrated in FIG. 8(*e*) formed by rectangular pulses. This signal is then amplified in amplifier 120.

It will be apparent from the foregoing that the signal derived from the signal carried by channel 105 is used to control a signal occurring in channel 105 at a later point of time. This control is of a twofold nature involving a minimum threshold and sliding threshold. The former is established by potentiometer 118, and the latter by the components 111,112 and 113.

With the contemplated dimensions of the clearance *d* and the bar height *b* (see FIG. 1 and the context thereof) it can hardly be prevented that the recognition logic sees not only the miniaturized code bars, but also alphanumeric characters, or man readable characters, respectively. The present circuitry allows a relatively large skew tolerance and the reading of portions of alphanumeric symbols along with the bar code symbols resulting from large skew tolerance is compensated by the correlation means shown in FIG. 4, and described in its context.

It will be understood that the signals to be inverted can be inverted individually, or in the summing amplifier and inverter 106 shown in FIG. 6.

I claim as my invention:

1. A bar code reading and processing system including a. a linear array of light sensitive sensor cells;
b. a plurality of individual pre-amplifiers for amplifying individually the output of each of said cells of said array;
c. a plurality of inverters for inverting the output of a portion of said plurality of pre-amplifiers;
d. a plurality of summing amplifiers for adding the non-inverted outputs and the inverted outputs of said plurality of pre-amplifiers;
e. a plurality of parallel connected diodes each in the output circuit of one of said plurality of summing amplifiers; and
f. a quantizer circuit connected to said plurality of diodes, said quantizer circuit including
g. a pair of parallel connected amplifying circuits both connected to the output of said plurality of diodes, said pair of amplifying circuits including
h. a first amplifying circuit having a capacitor charged through a diode and means for short-circuiting said diode in intervals of time;
i. a second amplifying circuit including a delay line; and
j. a comparator having a pair of inputs of which one is energized by said first amplifying circuit and the other is energized by said second amplifying circuit.

2. A bar code reading and processing system as specified in claim 1 for bar codes wherein each character is formed of four bars and three inter-bar spaces, comprising means for short-circuiting said diode in said first amplifying circuit during periods starting at the left-most leading edge of each bar code set and terminating a fixed period of time after the right edge of the right-most bar of said set.

* * * * *